Jan. 24, 1956     P. J. BERNER ET AL     2,732,448
ATTACHMENT DEVICE
Filed Aug. 25, 1954
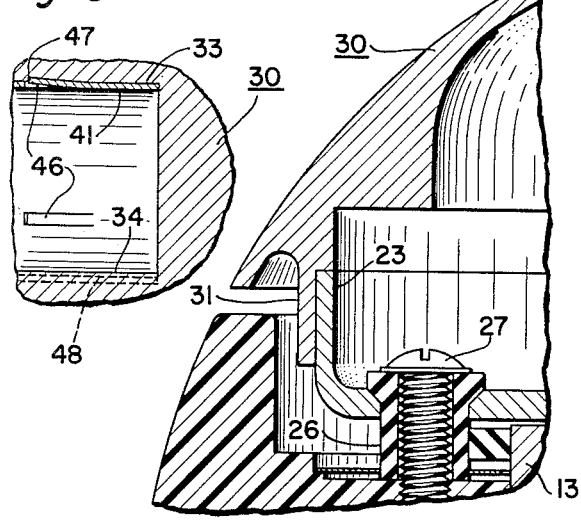
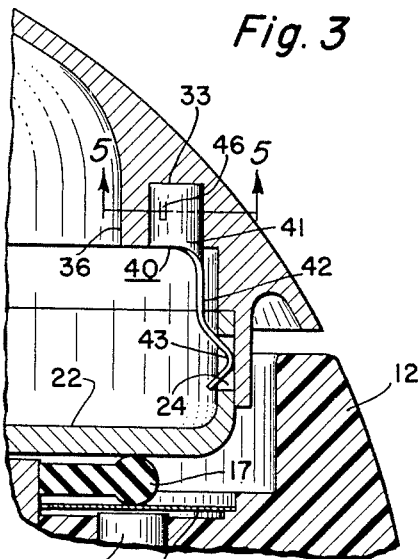
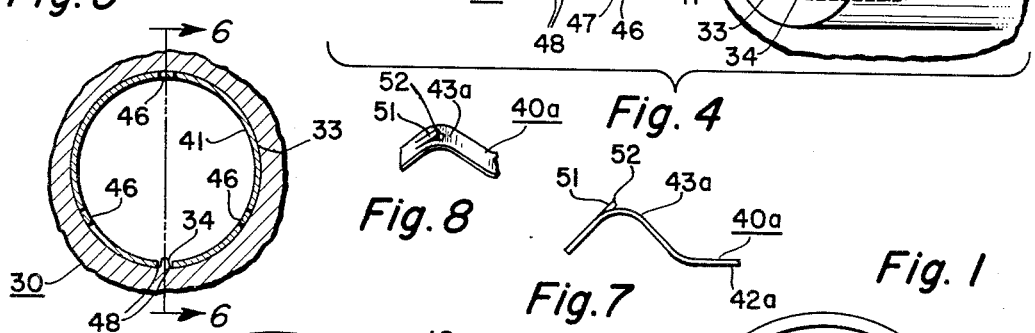
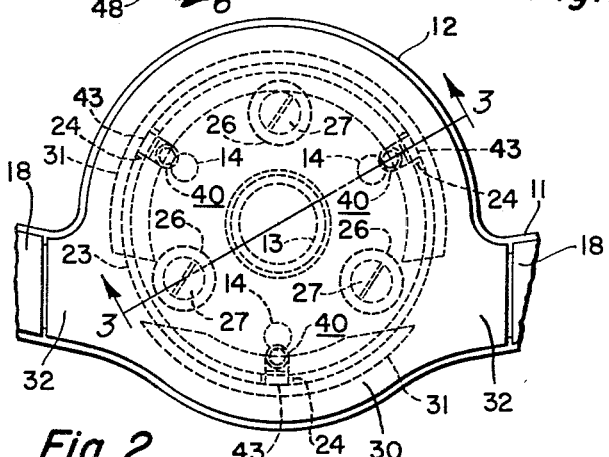
INVENTORS
James D. Connell
Philip J. Berner
BY
John T. Mansin
Their Attorney

United States Patent Office 2,732,448
Patented Jan. 24, 1956

2,732,448

ATTACHMENT DEVICE

Philip J. Berner and James D. Connell, Dayton, Ohio, assignors to General Motors Corporation, Detroit, Mich., a corporation of Delaware Application August 25, 1954, Serial No. 452,089

10 Claims. (Cl. 200—61.56)

This invention relates to attachment devices and particularly to a device for attaching a closure cap to the end of a steering column of an automobile.

An object of this invention is to provide an improved attaching device for removably securing one member to another member wherein the attaching element is separate from the members and locked to one member against removal therefrom.

Another object of this invention is to secure a sheet metal attaching spring clip element to a member of substantially soft material in a manner whereby a force applied to the clip in a direction tending to separate same from the member firmly locks the attaching clip to the member.

A further object of this invention is to mount an attaching element in a splined aperture in a substantially round closure cap member of soft material adapted to be removably secured to the open end of another member wherein the spline locates the element in a predetermined position relative to the axis of the aperture and wherein the element becomes more firmly locked in the aperture upon repeated separations of the cap member from the open-ended member.

In carrying out the foregoing objects it is a still further and more specific object of this invention to provide a novel method of and device for attaching a closure cap member, of die cast metal or molded plastic material, to the upper end of a steering column assembly of an automobile for closing an opening in the hub portion of a horn button ring which device removably holds the cap member resiliently in place and has barb means thereon adapted to bite into the material of the cap member upon applying a force thereto in a direction tending to remove same from the cap member to thereby become permanently locked thereto.

Further objects and advantages of the present invention will be apparent from the following description, reference being had to the accompanying drawings, wherein preferred embodiments of the present invention are clearly shown.

In the drawings:

Figure 1 is a plan view showing a steering wheel and a horn button ring mounted on the upper end of a steering column assembly having a cap member closing the opening in the hub portion of the ring provided with an attaching device constructed in accordance with this invention;

Figure 2 is an enlarged plan view of the hub portion of the steering column showing the removable horn button ring closure cap thereon;

Figure 3 is an enlarged fragmentary vertical sectional view taken on the line 3—3 of Figure 2 showing the mounting of the open top hub portion of the horn button ring to the steering column and a cap secured thereover by the present attachment device;

Figure 4 is an exploded perspective view showing a blind aperture in the closure cap and a spring clip element adapted to be inserted into the aperture;

Figure 5 is an enlarged fragmentary sectional view taken on the line 5—5 of Figure 3 showing barbs on the spring clip tightly engaging the wall of the clip mounting aperture and showing edges of the clip abutting a spline therealong to position the clip in the aperture;

Figure 6 is a sectional view taken on the line 6—6 of Figure 5 showing a barb on the spring clip biting into the wall of the clip mounting aperture;

Figure 7 is a side view of an end portion of a modified form of spring clip showing a barb thereon; and Figure 8 is a perspective view of the end of the spring clip element shown in Figure 7.

Referring to the drawings there is shown in Figure 1 thereof a steering wheel 10 connected by spokes 11 to a hub portion 12 (see Figure 3) secured to a metal mounting collar 13 mounted, in any suitable or conventional manner, on the upper end of a steering shaft of a steering column or mast of a vehicle. The hub portion 12 of a wheel 10 comprises any desired number of metal contact studs 14 each having its upper end spaced below a recessed top of the wheel hub. A thin resilient metal contact ring 16 rests on a shoulder provided in the bottom wall of the recess in the wheel hub 12 and is adapted to be flexed into engagement with a stud 14 to complete an electric circuit for energizing a horn. A rubber substantially O-ring 17 or the like is disposed above the contact ring 16 for spacing a movable horn button therefrom. This horn button comprises a substantially round cup-like hub portion or member having integral spokes 18 extending therefrom and formed integrally with a horn button ring 21. The hub member or portion of horn button ring 21 includes a bottom wall 22 and an upright collar or circular wall 23 (see Figure 3). The upright collar or wall 23 has a plurality, preferably three (see Figure 2), of spaced apart substantially rectangular openings or holes 24 therethrough for a purpose to be presently described. Bottom wall 22 has a plurality of round holes therein through each of which a shouldered insulating spacing collar-like stud 26 extends. A guide screw 27 passes through each collar stud 26 and is threaded into the hub portion 12 of wheel 10 for securing the horn button ring member to the steering wheel assembly. Force applied to ring 21 is transmitted through the spokes 18 to the hub member or portion thereof to move wall 22 downwardly over a collar stud 26 thus pressing ring 17 against contact ring 16 to flex ring 16 into engagement with a contact stud 14 and causing the horn to sound.

A substantially hollow cap member, generally represented by the reference character 30, formed of a relatively soft material such as die casting alloy metal, is removably secured to the steering wheel assembly by an attachment device constructed in accordance with the present invention for closing the open top of the hub member or portion of the horn button ring. While cap member 30 herein disclosed is defined as being die cast from metal it is to be understood that the same can, if desired, be formed of any other relatively soft material such as a molded plastic compound of synthetic resins and the like. Cap member 30 is formed to provide a depending shouldered flange or collar 31 thereon at least around the round portion thereof (see Figures 2 and 3) and outwardly extending short wings 32 (see Figure 2) which fit over a reduced portion of the spokes 18 and blend the cap 30 into the spokes 18 of the horn button ring 21. The cap member 30 is further provided with a plurality of spaced apart blind holes or apertures 33, each having a substantial depth and a straight raised spline 34 (see Figures 4, 5 and 6) extending inwardly from the peripheral wall thereof. Holes or apertures 33 are cast in bosses 36 formed on the underside of the hollow cap member 30 (see Figures 3 and 4). A relatively hard sheet metal spring clip element, generally represented by the reference character 40, having an elongated substantially C-shaped or split cylindrical body portion 41 and an integral tab portion 42 which is bent as at 43 to provide the same with an engaging surface (see Figure 4) is disposed in each of the apertures 33. The collared flange 31 on cap 30 snugly fits over the upright collar or wall 23 on the horn button ring hub member and the engaging surface of bent part 43 of the clip elements 40 abuts against the upper wall of the rectangular holes 24 provided in wall 23 (see Figure 3). Spring clip elements 40 bias the shoulder located on the inside of flange 31 of cap member 30 against the top of collar or wall 23 to prevent vibration of the cap member relative to the horn button ring hub to eliminate the creation of rattles. The bent portion 43 of the spring clip elements 40, fitting within the holes 24 and engaging the top wall thereof, removably secures cap member 30 to the hub member or portion of the horn button ring with considerable force. It has, prior to our invention, been a problem to lock a spring clip element of the type herein disclosed within an aperture against removal, particularly where the aperture faces the direction of pull or force applied to a cap member to remove same from the member to which it is secured. Such clips become loose after a few removals of the cap member from the member to which it is secured and fall out of the mounting apertures, thus rendering the attachment device ineffective and requiring replacement of the entire cap. The attachment device herein disclosed solves this problem and prolongs the life of a cap member having the device associated therewith so that the necessity of frequently replacing such caps is eliminated.

Each clip element 40 of the present attachment device is stamped to the desired shape from a blank sheet of spring steel and a plurality of ears or barbs 46 (see Figures 4 and 5) are struck from the wing portions of the stamped piece to extend the cut end thereof a substantial distance laterally of the piece. Any tool or die employed to strike the ears or barbs 46 from the stamped metal piece inherently leaves a sharp edge or burr 47 on at least the one side of the struck-out end of the ear or barb 46. Such a sharp edge or burr 47 is employed to serve an advantageous purpose in the attachment device herein disclosed. The blanked out piece has its wings, forming the split body portion 41 of the spring clip elements 40, rolled in a direction so that the sharp edge or burr 47 on the one side of the struck out end of the ears or barbs 46 is located on the outside of the C-shaped or split cylindrical body portion 41 of the clip elements 40 (see Figure 4) and extends laterally beyond the outer surface of this body. Edges 48 of the wings or body portion 41 of clip element 40 are rolled toward one another and are parallelly spaced a predetermined distance from each other (see Figures 4 and 5). These edges 48 are to cooperate with the positioning means provided by the straight raised spline 34 on the peripheral wall of aperture 33 for properly locating the tab portion 42 of the spring clip elements 40 in a position whereby this tab portion lies in a plane substantially paralleling the circumference of the flange or collar 31 on cap member 30. Thus, we also utilize the inherently present edges 48 for an advantageous purpose since they, together with the spline 34, comprise a means for positioning the clip elements 40 in the apertures 33 and prevent rejection of cap members 30 for the reason of misalignment of the spring clip elements relative to the axis of an aperture 33. Each clip element 40, shaped to the form thereof disclosed in Figure 4 of the drawings, is then forced into an aperture 33 against its rear wall with the edges 48 on the body portion 41 engaging opposed sides of the spline 34 which properly locates the clip elements 40 therein. In other words, the spline 34 and the spaced edges 48 on the clip elements 40 prevent these elements from being inserted into the apertures 33 in any but a predetermined position. As a spring clip element is forced into an aperture 33 the ears or barbs 47 are compressed and tightly engage the wall thereof. The sharp edge or burr 47 on ears or barbs 46 is pointed in a direction opposite the direction of movement of the elements 40 into the apertures 33 and therefore these burrs may or may not bite into the relative soft material from which the cap member 30 is cast or molded during insertion of the elements into the apertures 33. The sharp edge or burr 47 on barbs 46 is directed toward the open end of an aperture 33 and it therefore serves as a means for holding the clip 40 in the aperture and for firmly locking the clip therein when a force is applied thereto in a direction tending to remove the clip from the aperture. Any pressure or force applied to a clip 40 such, for example, as that required to remove detachable cap member 30 from the hub portion of the horn button ring, by forcing the bent part 43 of the spring clip elements 40 out of the holes 24 and over the upper inner surface portion of wall 23 above the holes 24, tends to loosen and pull the clip elements out of the apertures 33. However, since the sharp edge or burr 47 on the compressed ears or barbs 46 face the open end of apertures 33, this force causes the sharp edges or burrs 47 to dig or bite into the peripheral wall of these apertures as shown in Figure 6 of the drawing to more strongly or firmly lock or anchor a clip 40 therein against removal therefrom.

The modified form of spring clip element 40a disclosed in Figures 7 and 8 of the drawings is provided with the same essential portions 41, 46, 47 and 48 (not shown) and the portions 42a and 43a as the spring clip element 40 disclosed in other figures of the drawings and in addition is provided with a further or another cut out ear or barb 51 formed in the element 40a during the operation of blanking the same. The ear or barb 51 on this modified type of clip 40a is also provided with a sharp edge or burr 52 which normally extends slightly beyond the engaging surface of the spring clip element at the bend 43a thereof. Burr 52 inherently present on barb 51 is directed in a direction toward the body portion of clip element 40a so as to oppose movement of the clip element when the bent part 43a thereof is engaging a continuous wall surface of a member to which a cap is secured. The modified form of attachment device is intended for use in securing one member such as the cap member 30 to another member of relatively soft material where it may be impossible or impractical to provide the anchoring openings or holes 24 in this another member. In such case the engaging surface at the bent portion 43a of tab 42a on a spring clip element 40a would lie in abutting relation to a continuous wall portion of the member to which the cap member is secured. Any force applied to the cap member tending to separate same from the other member or element to which it is secured will cause the sharp edge or burr 52 on ear or barb 51 of the spring clips 40a to dig or bite into the wall of this other member or element to thus more strongly and firmly lock or anchor the cap member thereto. The modified form of sheet metal spring clip element 40a herein disclosed, in addition to having the advantageous feature of the spring clip elements 40 becoming firmly locked in the apertures 33 against removal, has the penetrating sharp edge or burr 52 which prevents detachment of a cap member from a mounting member unless an intentional strong removing or separating force is applied by a serviceman to the cap member.

In carrying out this invention it is essential that the material from which the spring clip element carrying cap member 30, whether of die cast metal or molded plastic material, be relatively soft as compared to the hardness of the metal spring clip elements 40. In the use of the modified form of spring clip element 40a disclosed the material of the mounting member for cap 30 should also be relatively soft as compared to the hardness of the metal spring clip elements 40a. By virtue of the substantially round cap member 30 being provided with the short wing portions 32, angularly offset with respect to the axis of the cap member 30 to match and fit over the spokes 18 of horn button ring 21, this cap member cannot be attached to the steering wheel assembly in any other than its proper position.

From the foregoing it should be apparent that an improved attachment device for securing a horn button ring hub closure cap to a steering wheel assembly on the end of a steering column or mast of a vehicle is provided. It should also be apparent that the attachment device disclosed may be used on other structures such, for example, as for detachably securing a hub cap to a tire carrying wheel to conceal studs employed to mount the wheel on an axle of an automobile. The improved attachment device holds the cap member in place in a biasing manner to prevent vibrations thereof and the spring clips of the device instead of becoming loose at their mounting in the cap, upon repeated removal operations of the cap from the steering column or mast, becomes more firmly anchored in the cap to prolong its use and avoid frequent replacements thereof. The edges of the split cylindrical body portion of the clip elements of the attachment device cooperate with the splined aperture in the cap member to produce a desired purpose or result and the sharp edge or burr inherently present on the ears or barbs, struck from the clip elements, serve to advantage in the present attachment device.

While the forms of embodiment of the invention as herein disclosed constitute preferred forms, it is to be understood that other forms might be adopted, as may come within the scope of the claims which follow.

What is claimed is as follows:

1. An attachment device for attaching a first member to a second member wherein the first member is formed of relatively soft material and includes an aperture therein of substantial depth having an axially extending positioning spline on the peripheral wall thereof, said device having an element of relatively hard metal carried by said first member and adapted to engage a part of said second member for securing the members to one another, said element including an elongated split substantially cylindrical body portion disposed in the aperture of said first member, means for locating said element in a predetermined position on said first member relative to the axis of the aperture therein, said means comprising the edges of said split cylindrical body portion of said element engaging opposed sides of said spline in the aperture as said element is inserted therein, means for holding the body portion of said element in said aperture against removal therefrom, said last named means comprising an ear stamped from said element body portion and having a sharp edge normally extending laterally beyond the outer surface thereof, said sharp edge on said ear being compressed against the wall of the aperture upon forcing the split cylindrical body portion of said element thereinto, and said sharp edge on said ear being adapted to bite into said wall of the aperture when a force is applied to said element in a direction tending to remove the same from the aperture whereby said element becomes firmly locked in the aperture.

2. An attachment device as defined in claim 1 wherein one of the members is formed of molded plastic material.

3. An attachment device as defined in claim 1 wherein the first member is of die cast metal.

4. A substantially round cap member adapted to be attached to an element having a round opening therein for closing the opening, said cap member being formed of relatively soft material and having an aperture therein of substantial depth provided with a raised axially extending positioning spline on the peripheral wall thereof, a plurality of relatively hard metal spring clips arranged in spaced apart relation around said round cap member for engaging a part of said element to detachably secure said cap member thereto, each of said spring clips including a flat end portion and an elongated split substantially cylindrical body portion disposed in said bore, means for locating said spring clip in said aperture whereby said flat end portion thereof lies substantially parallel with the circumference of said cap member, said means comprising the edges of said split body portion of said clip engaging opposed sides of said spline in said aperture as said clip is inserted therein, means for holding the body portion of said clip in said aperture against removal therefrom, said last named means comprising an ear stamped from the body portion of said spring clip and having a burr normally extending laterally beyond the outer surface thereof, and said burr on said ear being adapted when a force is applied to said clip in a direction tending to remove said body portion thereof from said aperture to firmly lock the same in the aperture.

5. The structure defined in claim 4 wherein the cap member is formed of molded plastic material.

6. The structure defined in claim 4 wherein the cap member is of die cast metal.

7. In combination with an open top hub portion of a horn button ring mounted on the end of a steering column assembly of an automobile, a collar around the open top hub portion of said ring forming a guide for a cap member adapted to be placed thereon for closing the open top thereof, said cap member being formed of relatively soft material and having an aperture therein of substantial depth provided with a raised spline on the peripheral wall thereof, a plurality of relatively hard metal spring clips arranged in spaced apart relation around said cap member and having a portion thereof engaging a part of said ring to detachably secure said cap member thereto, each of said spring clips also including an elongated split substantially cylindrical body portion disposed in said aperture, means for locating said ring engaging portion of said spring clip in a predetermined position on said cap member, said means comprising the edges of said split cylindrical body portion of said clip engaging opposed sides of said spline in said aperture as said clip is inserted therein, means for holding the body portion of said clip in said aperture against removal therefrom, said last named means comprising an ear stamped from the body portion of said spring clip and having a sharp burr normally extending laterally beyond the outer surface thereof, and said sharp burr on said ear being adapted to bite into said wall of the aperture when a force is applied to said clip in a direction tending to remove the body portion thereof from the aperture whereby said spring clip becomes firmly locked in the aperture.

8. The combination defined in claim 7 wherein the cap member is formed of molded plastic material.

9. The combination defined in claim 7 wherein the cap member is of die cast metal.

10. An attachment device for attaching a cap member to another member wherein the cap member is formed of relatively soft material and has an aperture therein, said device including a sheet metal spring clip element carried by said cap member, said spring clip element having an elongated split cylindrical body portion disposed in the aperture of said cap member and an integral tab portion extending therefrom adapted to engage a part of said another member for removably securing the members to one another, means for locating the tab portion of said spring clip element in a predetermined position on said cap member relative to the axis of the aperture therein, means for holding the body portion of said spring clip element in said aperture against removal therefrom, said holding means comprising a barb stamped from the sheet metal body portion of said spring clip element and normally extending laterally beyond the outer surface thereof, the diameter of said outer surface of the split cylindrical body portion of said sheet metal spring clip element being so related to the diameter of the aperture in said cap member as to compress said barb against the peripheral wall of said aperture when said body portion is forced thereinto, and said barb being adapted to dig into said aperture wall when a force is applied to said spring clip element in a direction tending to remove same from said aperture whereby said element becomes firmly locked to said cap member.

References Cited in the file of this patent

UNITED STATES PATENTS

| | | |
|---|---|---|
| 1,400,155 | Greenburg | Dec. 13, 1921 |
| 1,675,787 | Carr | July 3, 1928 |
| 2,181,783 | Creson | Nov. 28, 1939 |
| 2,295,444 | Woodward | Sept. 8, 1942 |